US012627436B2

(12) United States Patent
Oteri et al.

(10) Patent No.: US 12,627,436 B2
(45) Date of Patent: May 12, 2026

(54) LOCATION ESTIMATION AND UPLINK BANDWIDTH AGGREGATION

(71) Applicant: Apple Inc., Cupertino, CA (US)

(72) Inventors: Oghenekome Oteri, San Diego, CA (US); Hong He, Cupertino, CA (US); Seyed Ali Akbar Fakoorian, San Diego, CA (US); Dawei Zhang, Saratoga, CA (US); Haitong Sun, Cupertino, CA (US); Wei Zeng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 394 days.

(21) Appl. No.: 18/452,976

(22) Filed: Aug. 21, 2023

(65) Prior Publication Data

US 2024/0275550 A1     Aug. 15, 2024

Related U.S. Application Data

(60) Provisional application No. 63/485,178, filed on Feb. 15, 2023.

(51) Int. Cl.
| | |
|---|---|
| *H04L 5/00* | (2006.01) |
| *H04W 72/0453* | (2023.01) |
| *H04W 72/232* | (2023.01) |

(52) U.S. Cl.
CPC ............ *H04L 5/0048* (2013.01); *H04L 5/001* (2013.01); *H04W 72/0453* (2013.01); *H04W 72/232* (2023.01)

(58) Field of Classification Search
CPC .. H04L 5/0048; H04L 5/001; H04W 72/0453; H04W 72/23–232
See application file for complete search history.

(56) References Cited

U.S. PATENT DOCUMENTS

| | | | | |
|---|---|---|---|---|
| 2020/0107308 A1* | 4/2020 | Liao | ...................... | H04W 72/12 |
| 2020/0266942 A1* | 8/2020 | Akkarakaran | .......... | H04W 8/08 |
| 2020/0296635 A1* | 9/2020 | Rastegardoost | ...... | H04L 5/0048 |
| 2022/0014329 A1* | 1/2022 | Qi | ...................... | H04W 72/046 |
| 2022/0045811 A1* | 2/2022 | Lin | ...................... | H04L 5/0041 |

(Continued)

FOREIGN PATENT DOCUMENTS

| | | | | |
|---|---|---|---|---|
| WO | WO-2022028295 A1 * | 2/2022 | ............ | H04W 72/23 |

OTHER PUBLICATIONS

International Search Report for PCT/US2024/012731; May 7, 2024.
(Continued)

*Primary Examiner* — Kevin C. Harper
(74) *Attorney, Agent, or Firm* — Kowert, Hood, Munyon, Rankin & Goetzel, P.C.

(57) ABSTRACT

Apparatuses, systems, and methods for bandwidth aggregation of positioning sounding reference signals (positioning SRS), e.g., in 5G NR systems and beyond. A UE may report, to a network one or more capabilities associated with bandwidth aggregation for a positioning procedure for location estimation. The UE may receive, from the network, configuration information and/or scheduling information. The UE may select frequencies for transmission of positioning SRS and may transmit positioning SRS on the selected frequencies. The network may aggregate the positioning SRS over a range of bandwidth to estimate a location of the UE.

20 Claims, 8 Drawing Sheets

(56)  References Cited

U.S. PATENT DOCUMENTS

2023/0141465 A1*  5/2023  Nam ..................... G01S 5/0284
                                                  455/456.1
2025/0008500 A1*  1/2025  Manolakos ....... H04W 72/0457

OTHER PUBLICATIONS

Huawei et al. "Finalizing SRS for NR positioning"; 3GPP TSG RAN WG1 Meeting #101-e R1-2003522; May 25, 2020.
Intel Corp "Summary for NR-Positioning AI - 7.2.10.1.2 UL only based Positioning"; 3GPP TSG RAN WG1 Meeting #96 R1-1903395; Feb. 25, 2019.

* cited by examiner

LOCATION ESTIMATION AND UPLINK BANDWIDTH AGGREGATION

PRIORITY INFORMATION

This application claims priority to U.S. Provisional Patent Application Ser. No. 63/485,178, entitled "Location Estimation and Uplink Bandwidth Aggregation," filed Feb. 15, 2023, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for aggregation of bandwidth for uplink reference signals such as positioning reference signals (PRSs), e.g., in cellular systems, such as LTE systems, 5G NR systems, and beyond.

DESCRIPTION OF THE RELATED ART

Wireless communication systems are rapidly growing in usage. In recent years, wireless devices such as smart phones, wearable devices or accessory devices), and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for aggregation of bandwidth of uplink reference signals, e.g., positioning sounding reference signals (positioning SRS), e.g., in 5G NR systems and beyond.

In some embodiments, a user equipment (UE) may receive, from a cellular network, configuration information for position estimation using bandwidth aggregation, the position estimation using bandwidth aggregation comprising transmission of positioning sounding reference signals (SRS) on a plurality of component carriers (CCs). The UE may receive, from the cellular network, signaling scheduling one or more uplink transmission and determine, based on the signaling and the configuration information, to transmit positioning SRS on at least some selected CCs of the plurality of CCs at a first time. The UE may transmit, to the cellular network, the positioning SRS on the selected CCs at the first time.

The network may determine respective arrival times of the positioning SRS on respective CCs of the selected CCs. The network may perform bandwidth aggregation to estimate a position for the UE based on the respective arrival times.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figures 1A, 1B:
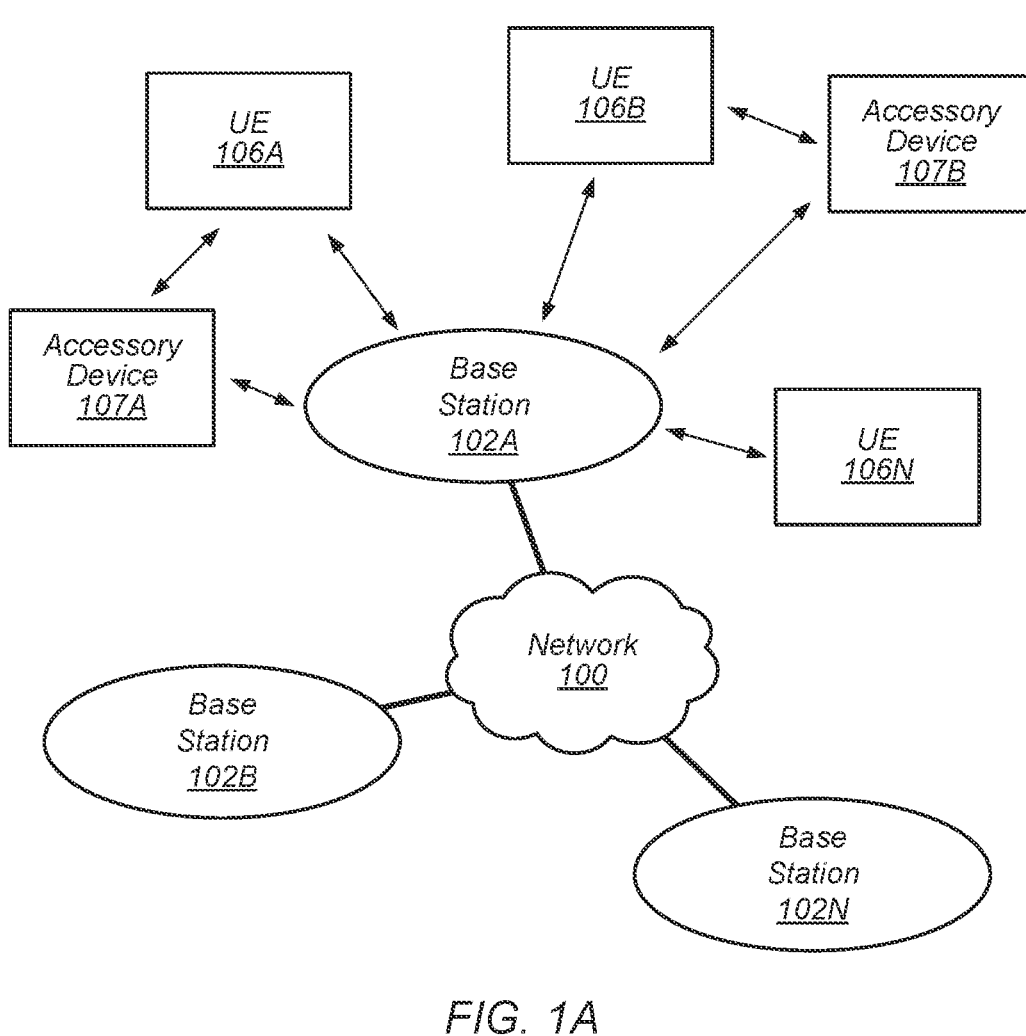
FIG. 1A illustrates an example wireless communication system according to some embodiments.
FIG. 1B illustrates an example of a base station and an access point in communication with a user equipment (UE) device, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI: Channel State Information
CSI-RS: Channel State Information Reference Signal
CMR: Channel Measurement Resource
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Information
Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAS, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHZ to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more wireless devices, such as user devices 106A, 106B, etc., through 106N, as well as accessory devices, such as user devices 107A, 107B. Each of the user devices may be referred to herein as a "user equipment" (UE). Thus, the user devices 106 and 107 are referred to as UEs or UE devices.

The base station (BS) 102A may be a base transceiver station (BTS) or cell site (a "cellular base station") and may include hardware that enables wireless communication with the UEs 106A through 106N as well as UEs 107A and 107B.

The communication area (or coverage area) of the base station may be referred to as a "cell." The base station 102A and the UEs 106/107 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106/107 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106/107 as illustrated in FIG. 1, each UE 106/107 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106/107 may be capable of communicating using multiple wireless communication standards. For example, the UE 106/107 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, CHRPD), etc.). The UE 106/107 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Note that accessory devices 107A/B may include cellular communication capability and hence are able to directly communicate with cellular base station 102A via a cellular RAT. However, since the accessory devices 107A/B are possibly one or more of communication, output power, and/or battery limited, the accessory devices 107A/B may in some instances selectively utilize the UEs 106A/B as a proxy for communication purposes with the base station 102A and hence to the network 100. In other words, the accessory devices 107A/B may selectively use the cellular communication capabilities of its companion device (e.g., UEs 106A/B) to conduct cellular communications. The limitation on communication abilities of the accessory devices 107A/B may be permanent, e.g., due to limitations in output power or the RATs supported, or temporary, e.g., due to conditions such as current battery status, inability to access a network, or poor reception.

FIG. 1B illustrates user equipment 106 (e.g., one of the devices 106A through 106N) and accessory device (or user equipment) 107 (e.g., one of the devices 107A or 107B) in communication with a base station 102 and an access point 112 as well as one another, according to some embodiments. The UEs 106/107 may be devices with both cellular communication capability and non-cellular communication capability (e.g., Bluetooth, Wi-Fi, and so forth) such as a mobile phone, a wearable device, a hand-held device, a computer or a tablet, or virtually any type of wireless device. The accessory device 107 may be a wearable device such as a smart watch. The accessory device 107 may comprise cellular communication capability and be capable of directly communicating with the base station 102 as shown. Note that when the accessory device 107 is configured to directly communicate with the base station, the accessory device may be said to be in "autonomous mode." In addition, the accessory device 107 may also be capable of communicating with another device (e.g., UE 106), referred to as a proxy device, intermediate device, or companion device, using a short-range communications protocol; for example, the accessory device 107 may according to some embodiments be "paired" with the UE 106, which may include establishing a communication channel and/or a trusted communication relationship with the UE 106. Under some circumstances, the accessory device 107 may use the cellular functionality of this proxy device for communicating cellular voice and/or data with the base station 102. In other words, the accessory device 107 may provide voice and/or data packets intended for the base station 102 over the short-range link to the UE 106, and the UE 106 may use its cellular functionality to transmit (or relay) this voice and/or data to the base station on behalf of the accessory device 107. Similarly, the voice and/or data packets transmitted by the base station and intended for the accessory device 107 may be received by the cellular functionality of the UE 106 and then may be relayed over the short-range link to the accessory device. As noted above, the UE 106 may be a mobile phone, a tablet, or any other type of hand-held device, a media player, a computer, a laptop or virtually any type of wireless device. Note that when the accessory device 107 is configured to indirectly communicate with the base station 102 using the cellular functionality of an intermediate or proxy device, the accessory device may be said to be in "relay mode."

The UE 106/107 may include a processor that is configured to execute program instructions stored in memory. The UE 106/107 may perform any of the method embodiments described herein by executing such stored instructions. Alternatively, or in addition, the UE 106/107 may include a programmable hardware element such as an FPGA (field-programmable gate array) that is configured to perform any of the method embodiments described herein, or any portion of any of the method embodiments described herein.

The UE 106/107 may include one or more antennas for communicating using one or more wireless communication protocols or technologies. In some embodiments, the UE 106 may be configured to communicate using, for example, CDMA2000 (1×RTT/1×EV-DO/HRPD/cHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106/107 may share one or more parts of a receive and/or transmit chain between multiple wireless communication technologies, such as those discussed above.

In some embodiments, the UE 106/107 may include separate transmit and/or receive chains (e.g., including separate antennas and other radio components) for each wireless communication protocol with which it is configured to communicate. As a further possibility, the UE 106/107 may include one or more radios which are shared between multiple wireless communication protocols, and one or more radios which are used exclusively by a single wireless communication protocol. For example, the UE 106/107 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
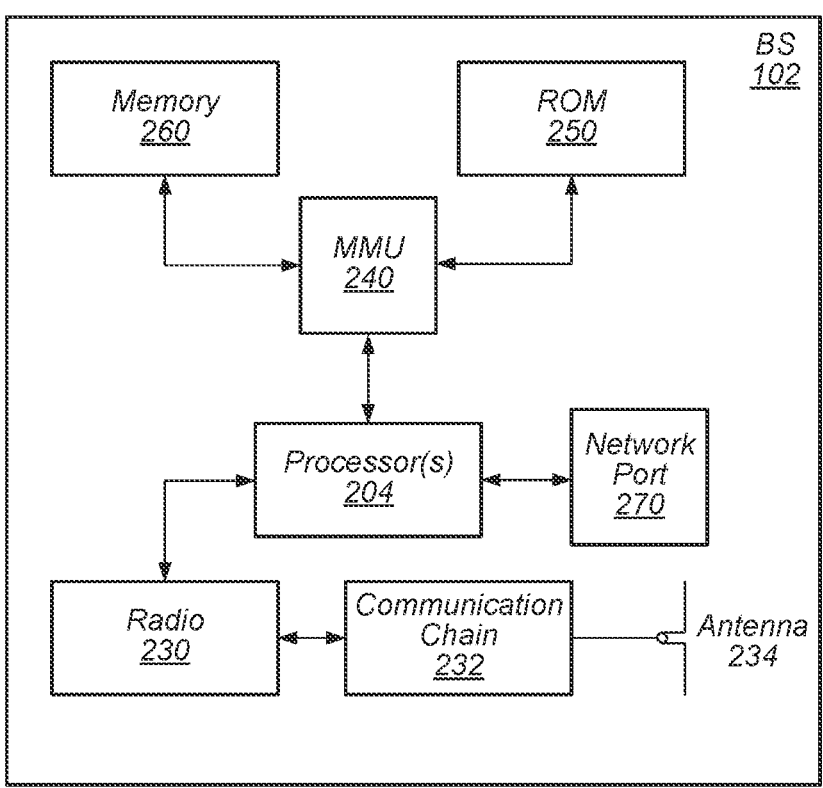
FIG. 2 illustrates an example block diagram of a base station, according to some embodiments.

FIG. 2: Block Diagram of a Base Station

Figure 3:
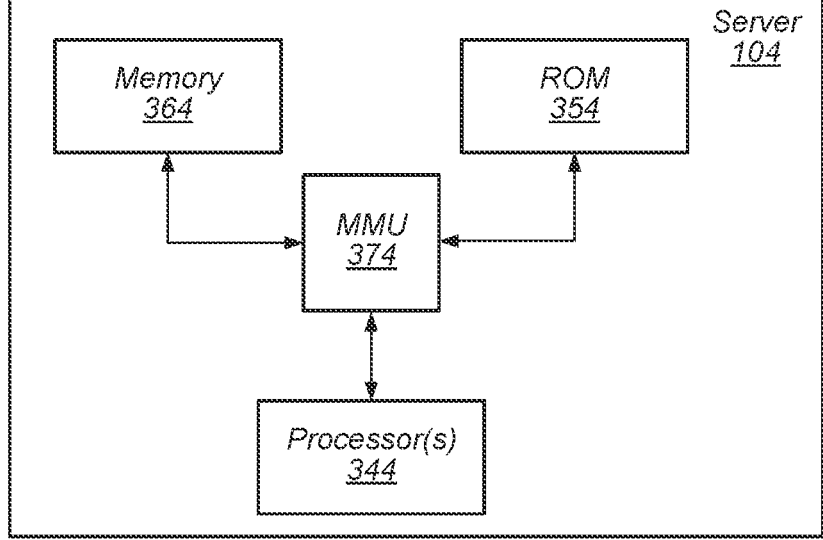
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR. LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (Ics) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (Ics) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102. UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (Ics) that are configured to perform the functions of processor(s) 344. In addition, each integrated circuit may include circuitry (e.g., first circuitry, second circuitry, etc.) configured to perform the functions of processor(s) 344.

Figure 4:
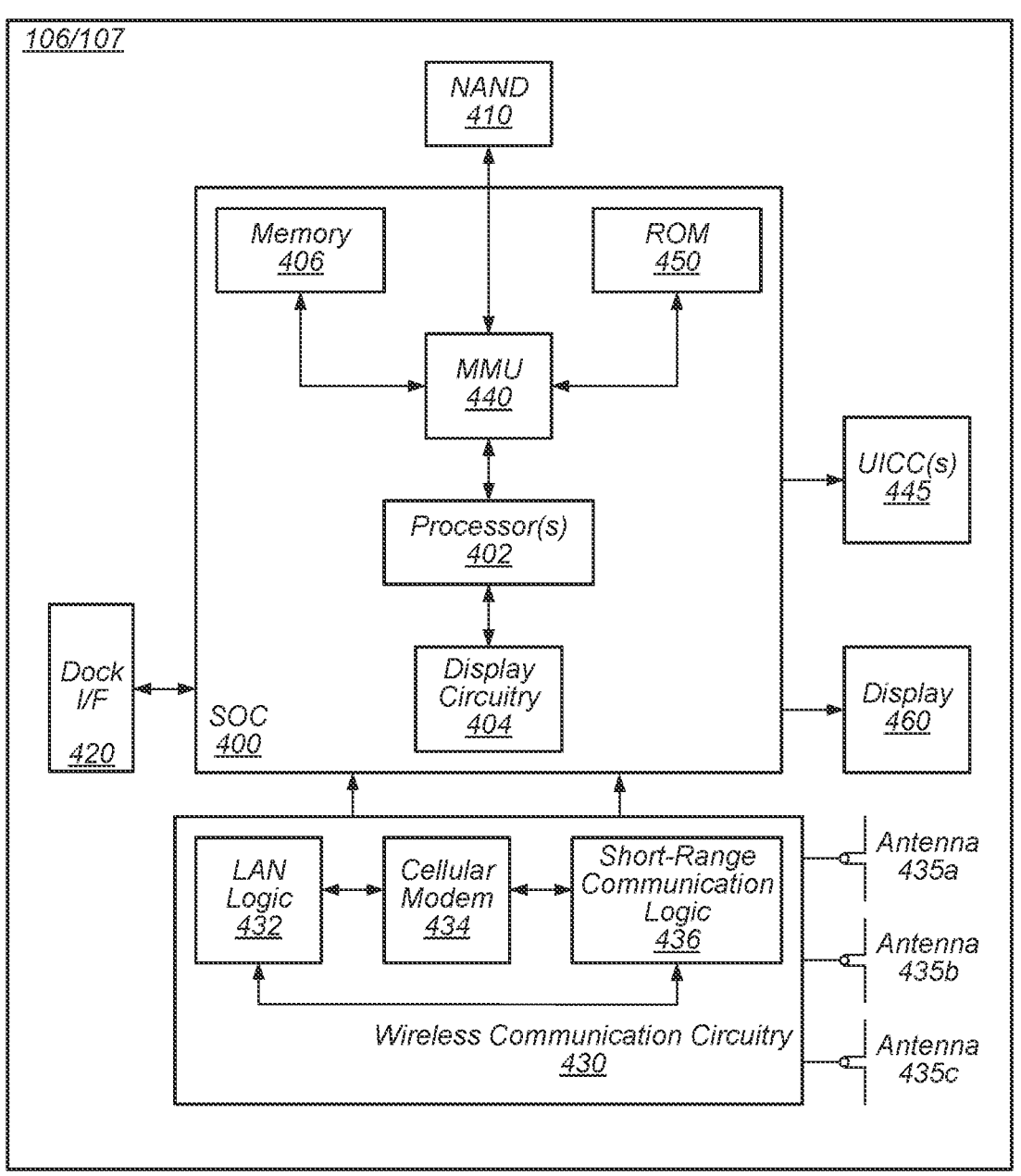
FIG. 4 illustrates an example block diagram of a UE according to some embodiments.

FIG. 4: Block Diagram of a UE

FIG. 4 illustrates an example simplified block diagram of a communication device 106/107, according to some embodiments. It is noted that the block diagram of the communication device of FIG. 4 is only one example of a possible communication device. According to embodiments, communication device 106/107 may be a user equipment (UE) device, a mobile device or mobile station, a wireless device or wireless station, a desktop computer or computing device, a mobile computing device (e.g., a laptop, notebook, or portable computing device), a wearable device, a tablet, an unmanned aerial vehicle (UAV), a UAV controller (UAC) and/or a combination of devices, among other devices. As shown, the communication device 106/107 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106/107 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106/107, and wireless communication circuitry 430. The wireless communication circuitry 430 may include a cellular modem 434 such as for 5G NR. LTE, GSM, etc., and short to medium range wireless communication logic 436 (e.g., Bluetooth™ and WLAN circuitry). In some embodiments, communication device 106/107 may include wired communication circuitry (not shown), such as a network interface card, e.g., for Ethernet.

The wireless communication circuitry 430 may couple (e.g., communicatively; directly or indirectly) to one or more antennas, such as antennas 435a, 435b, and 435c (e.g., 435a-c) as shown. The wireless communication circuitry 430 may include local area network (LAN) logic 432, the cellular modem 434, and/or short-range communication logic 436. The LAN logic 432 may be for enabling the UE device 106/107 to perform LAN communications, such as Wi-Fi communications on an 802.11 network, and/or other WLAN communications. The short-range communication logic 436 may be for enabling the UE device 106/107 to perform communications according to a short-range RAT, such as Bluetooth or UWB communications. In some scenarios, the cellular modem 434 may be a lower power cellular modem capable of performing cellular communication according to one or more cellular communication technologies.

In some embodiments, as further described below, cellular modem 434 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular modem 434 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106/107 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106/107 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106/107 may include at least two SIMs. Each SIM may execute one or more SIM applications and/or otherwise implement SIM functionality. Thus, each SIM may be a single smart card that may be embedded, e.g., may be soldered onto a circuit board in the UE 106/107, or each SIM 410 may be implemented as a removable smart card. Thus, the SIM(s) may be one or more removable smart cards (such as UICC cards, which are sometimes referred to as "SIM cards"), and/or the SIMS 410 may be one or more embedded cards (such as embedded UICCs (CUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106/107 may include a combination of removable smart cards and fixed/non-removable smart cards (such as one or more eUICC cards that implement eSIM functionality), as desired. For example, the UE 106/107 may comprise two embedded SIMs, two removable SIMs, or a combination of one embedded SIMs and one removable SIMs. Various other SIM configurations are also contemplated.

As noted above, in some embodiments, the UE 106/107 may include two or more SIMs. The inclusion of two or more SIMs in the UE 106/107 may allow the UE 106/107 to support two different telephone numbers and may allow the UE 106/107 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106/107 comprises two SIMs, the UE 106/107 may support Dual SIM Dual Active (DSDA) functionality. The DSDA functionality may allow the UE 106/107 to be simultaneously connected to two networks (and use two different RATs) at the same time, or to simultaneously maintain two connections supported by two different SIMs using the same or different RATs on the same or different networks. The DSDA functionality may also allow the UE 106/107 to simultaneously receive voice calls or data traffic on either phone number. In certain embodiments the voice call may be a packet switched communication. In other words, the voice call may be received using voice over LTE (VOLTE) technology and/or voice over NR (VONR) technology. In some embodiments, the UE 106/107 may support Dual SIM Dual Standby (DSDS) functionality. The DSDS functionality may allow either of the two SIMs in the UE 106/107 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for location estimation incorporating bandwidth aggregation of positioning sounding reference signals (SRS), e.g., in 5G NR systems and beyond, as further described herein.

As described herein, the communication device 106/107 may include hardware and software components for implementing the above features for a communication device 106/107 to communicate a scheduling profile for power savings to a network. The processor 402 of the communication device 106/107 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (Ics) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (Ics) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more Ics that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
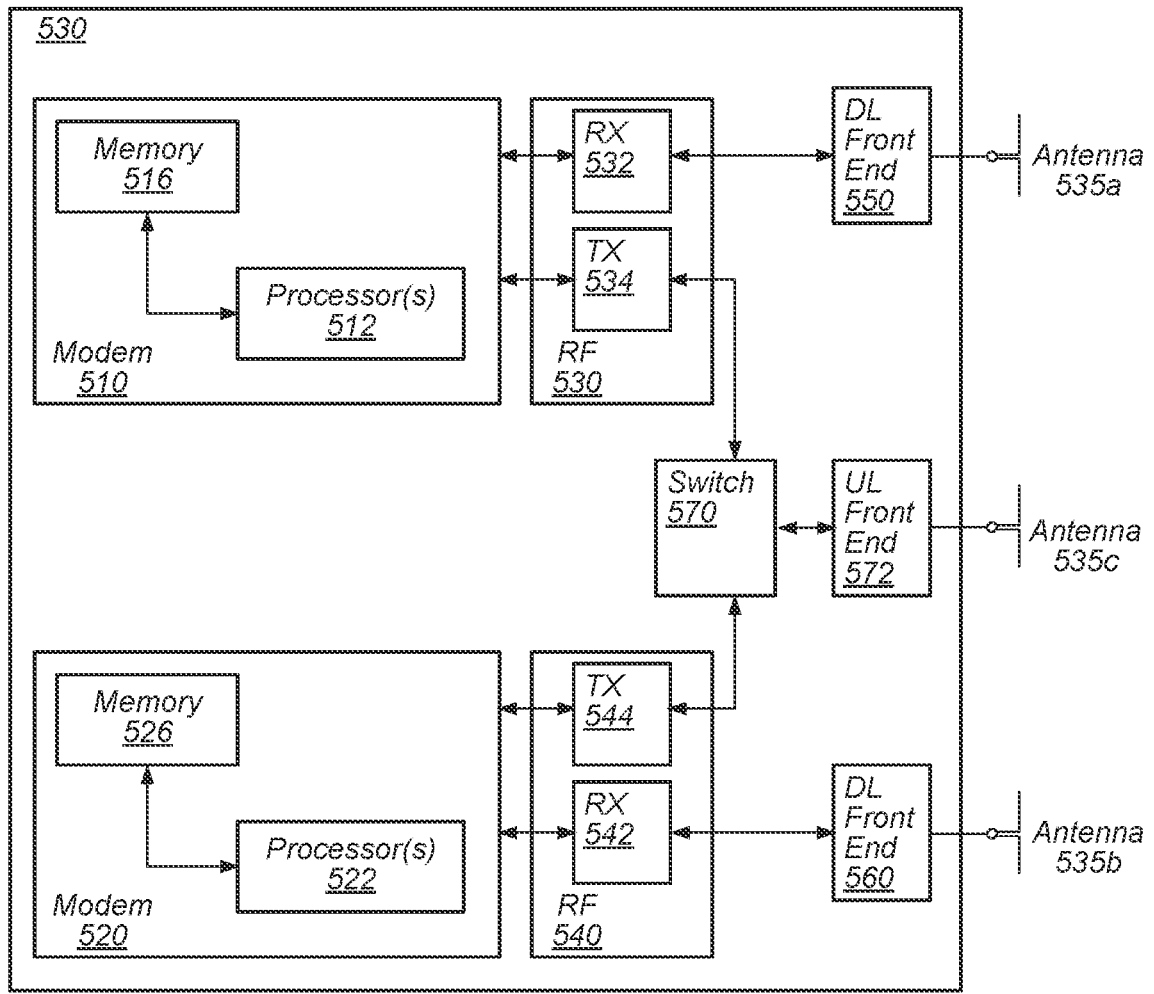
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular modem circuitry 434, may be included in a communication device, such as communication device 106/107 described above. As noted above, communication device 106/107 may be a user equipment (UE) device, a mobile device or mobile station, a wireless device or wireless station, a desktop computer or computing device, a mobile computing device (e.g., a laptop, notebook, or portable computing device), a tablet, a wearable device, and/or a combination of devices, among other devices.

The cellular communication circuitry 530 may couple (e.g., communicatively; directly or indirectly) to one or more antennas, such as antennas 535*a-c* (which may be antennas 435*a-c* of FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 535*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 535*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 535*c*. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for location estimation incorporating bandwidth aggregation of positioning sounding reference signals (SRS), e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 535*a-c* may be configured to implement part or all of the features described herein.

In addition, as described herein, processors 512 may include one or more processing elements. Thus, processors 512 may include one or more integrated circuits (Ics) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for location estimation incorporating bandwidth aggregation of positioning sounding reference signals (SRS), e.g., in 5G NR systems and beyond, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 535*a-c* may be configured to implement part or all of the features described herein.

In addition, as described herein, processors 522 may include one or more processing elements. Thus, processors 522 may include one or more integrated circuits (Ics) that are configured to perform the functions of processors 522. In addition, each integrated circuit may include circuitry (e.g., first circuitry, second circuitry, etc.) configured to perform the functions of processors 522.

Figure 6A:
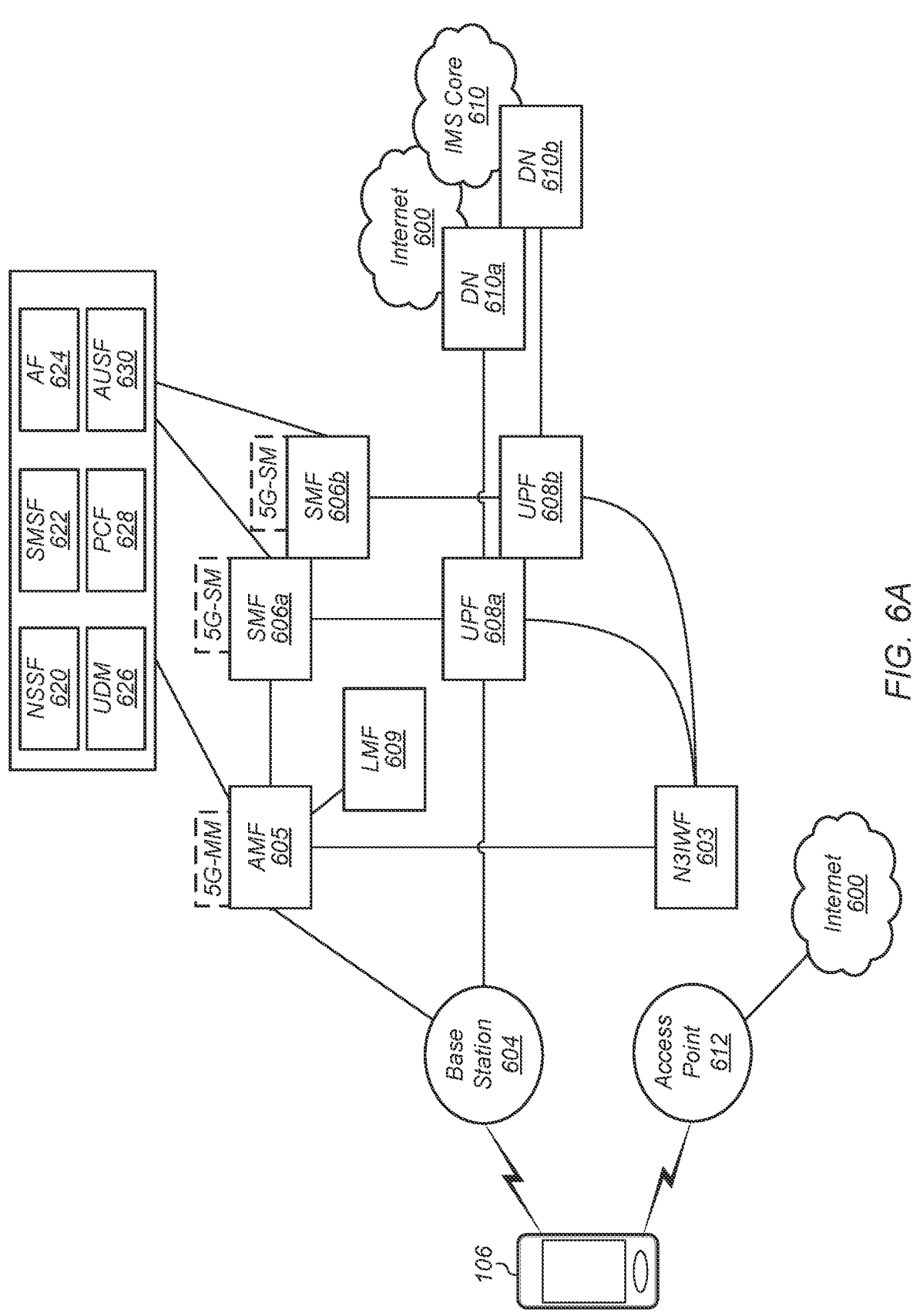
FIG. 6A illustrates an example of a 5G network architecture that incorporates both 3GPP (e.g., cellular) and non-3GPP (e.g., non-cellular) access to the 5G CN, according to some embodiments.
Figure 6B:
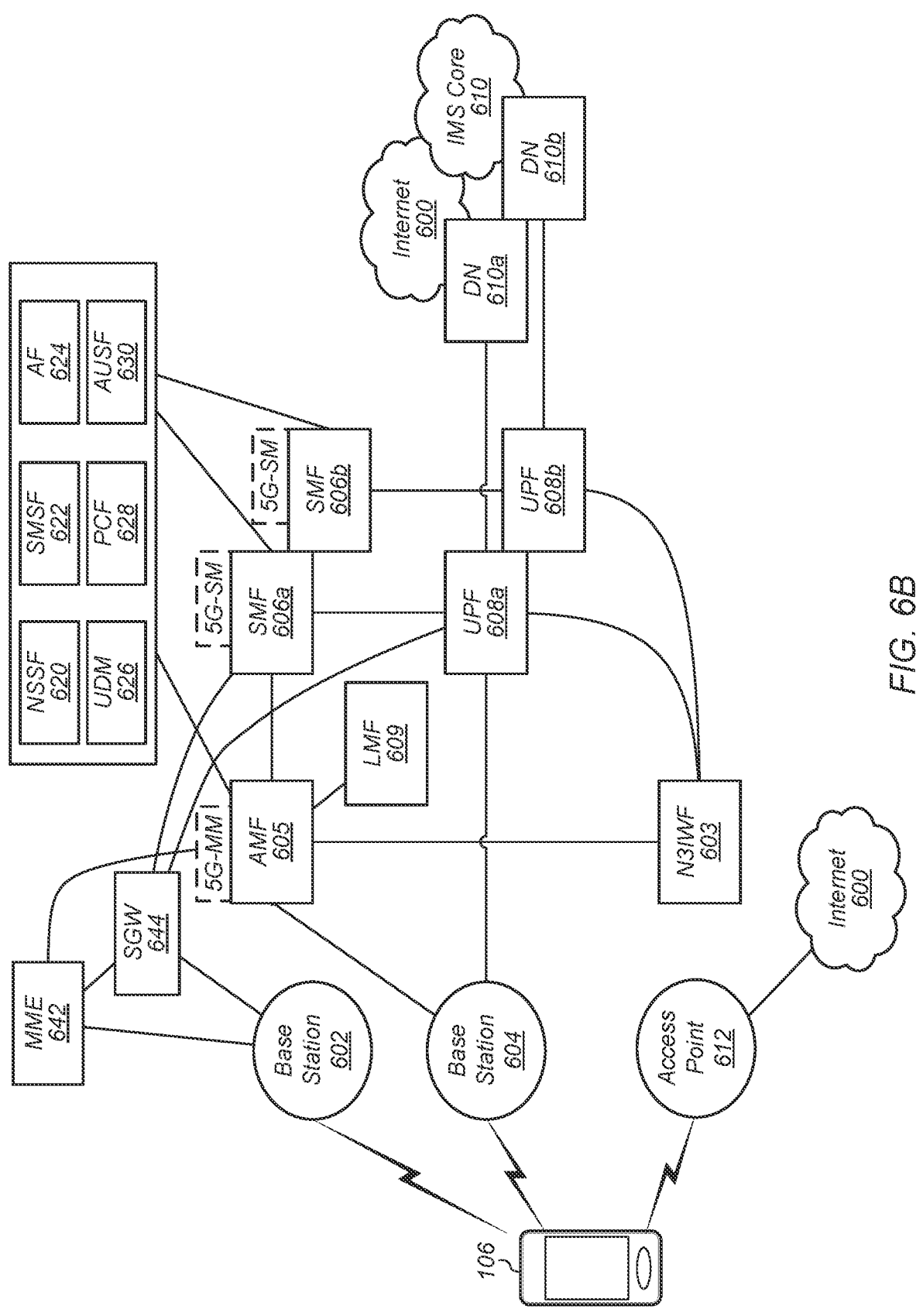
FIG. 6B illustrates an example of a 5G network architecture that incorporates both dual 3GPP (e.g., LTE and 5G NR) access and non-3GPP access to the 5G CN, according to some embodiments.
Figure 7:
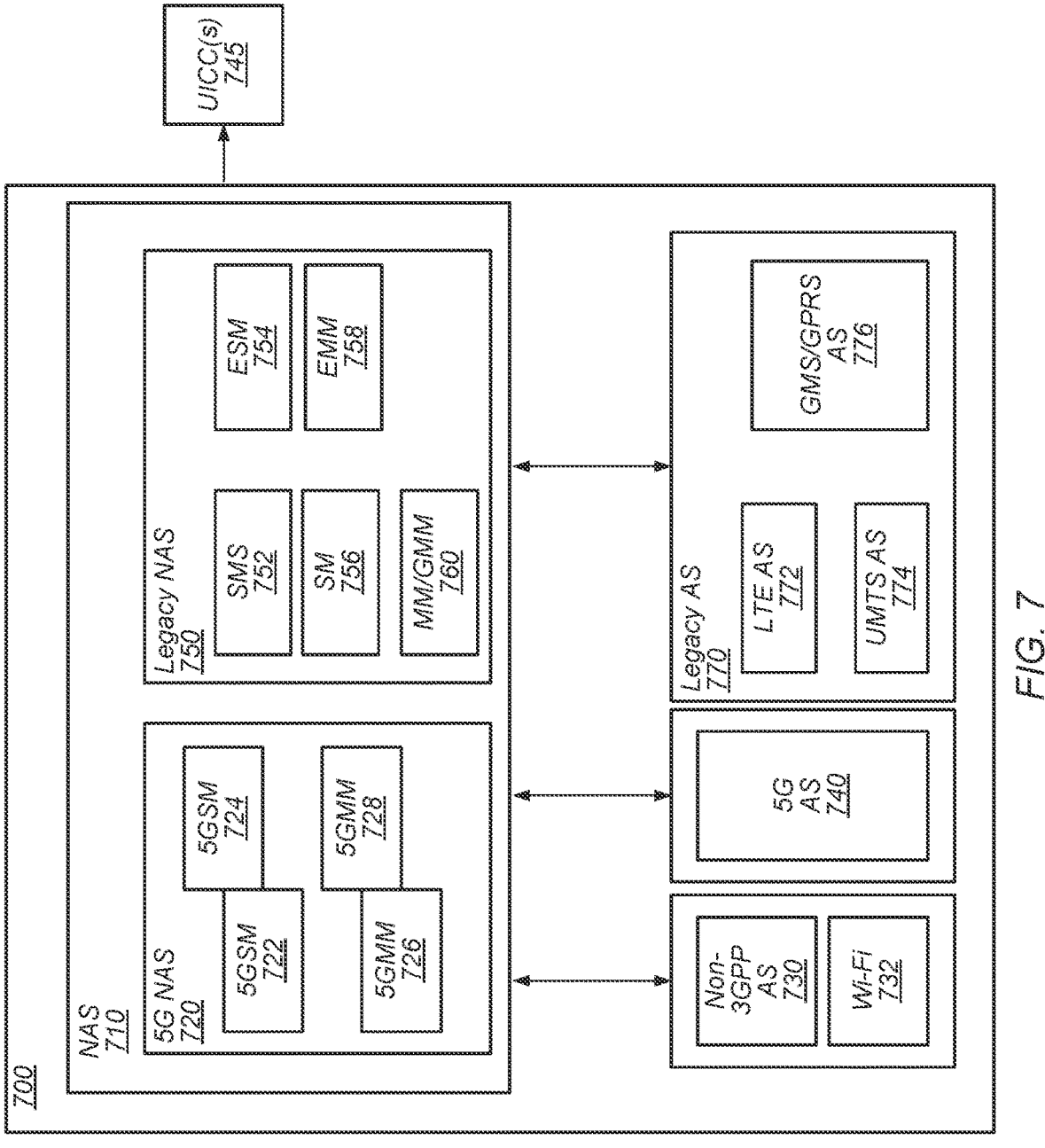
FIG. 7 illustrates an example of a baseband processor architecture for a UE, according to some embodiments.

FIGS. 6A, 6B and 7: 5G Core Network Architecture—Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106/107. In addition, the RAN (e.g., gNB 604) may also have a connection to the AMF 605. Thus, the 5G CN may support unified authentication over both connections as well as allow simultaneous registration for UE 106/107 access via both gNB 604 and AP 612. As shown, the AMF 605 may be in communication with a location management function (LMF) 609 via a networking interface, such as an NLs interface. The LMF 609 may receive measurements and assistance information from the RAN (e.g., gNB 604) and the UE (e.g., UE 106) via the AMF 605. The LMF 609 may be a server (e.g., server 104) and/or a functional entity executing on a server. Further, based on the measurements and/or assistance information received from the RAN and the UE, the LMF may determine a location of the UE. In addition, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106/107. In addition, the RAN (e.g., gNB 604) may also have a connection to the AMF 605. Thus, the 5G CN may support unified authentication over both connections as well as allow simultaneous registration for UE 106/107 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may be in communication with an LMF 609 via a networking interface, such as an NLs interface, e.g., as described above, and may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above-described network entities may be configured to perform methods for location estimation incorporating bandwidth aggregation of positioning sounding reference signals (SRS), e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for bandwidth aggregation for positioning sounding reference signals (SRS), e.g., in 5G NR systems and beyond, e.g., as further described herein.

Positioning Reference Signals

NR positioning enhancements is a topic of interest. Solutions necessary to support the high accuracy (horizontal and vertical), low latency, network efficiency (scalability, RS overhead, etc.), and device efficiency (power consumption, complexity, etc.) requirements for commercial uses cases (incl. general commercial use cases and specifically internet of things (IoT) use cases may be desired. Further, identification and evaluation of positioning techniques, DL/UL positioning reference signals, signaling and procedures for improved accuracy, reduced latency, network efficiency, and device efficiency may be studied. Aggregating multiple positioning frequency layers of the same or different bands may be useful for improving positioning performance for both intra-band and inter-band scenarios. Aggregation of NR positioning frequency layers may improve positioning accuracy under certain scenarios, configurations, and assumptions on modelled impairments such as: bandwidth and spacing of aggregated layers, timing offset and frequency offset over frequency layers, phase discontinuity and possible amplitude imbalance.

Sounding reference signals (SRS) may be a type of uplink (UL) RS. Positioning SRS may be used for location estimation, e.g., a network may used SRS received from a UE to estimate a position of the UE at the time the SRS was transmitted. Aggregation of SRS (e.g., across frequencies/bandwidth) for positioning resources may improve accuracy and/or other aspects of location estimation. Simultaneous transmission by the UE and aggregated reception by the network (e.g., gNB) of the SRS for positioning in multiple carriers (e.g., contiguous intra-band carriers and/or non-contiguous and/or inter-band carriers) may be used as further discussed herein. From both network and UE perspective, the applicability and/or feasibility of this enhancement for different scenarios, configurations, particular bands and/or RF architectures, may be improved as described herein, among various possibilities. For example, techniques discussed herein may allow for bandwidth aggregation for positioning measurements across carriers (e.g., in some embodiments, up to three intra-band contiguous carriers, but in other embodiments different numbers and/or types of carriers may ne used). Related signaling and procedures to support aggregation of SRS resources across carriers discussed. In some embodiments, positioning measurements may be performed using signals over aggregated resources that are transmitted and received (respectively) using a single RF chain (e.g. a transmitting UE may use a single antenna to transmit positioning SRS over the aggregated resources and a receiving base station (e.g., TRP) may use a single antenna to receive the positioning SRS over the aggregated resources). The support of bandwidth aggregation for positioning measurements may apply to timing related measurements (e.g., RS time difference (RSTD), relative time of arrival (RTOA), and UE/BS Rx-Tx time difference), among various possibilities.

Embodiments described herein provided systems, methods, and mechanisms for bandwidth aggregation, e.g., of uplink reference signals for positioning, e.g., positioning SRS, including systems, methods and mechanisms for bandwidth aggregation for positioning SRS. Note that positioning SRS may sometimes also be referred to as SRS-pos or similar terms. Thus, for example, the embodiments described herein address problems associated with such bandwidth aggregation.

Figure 8:
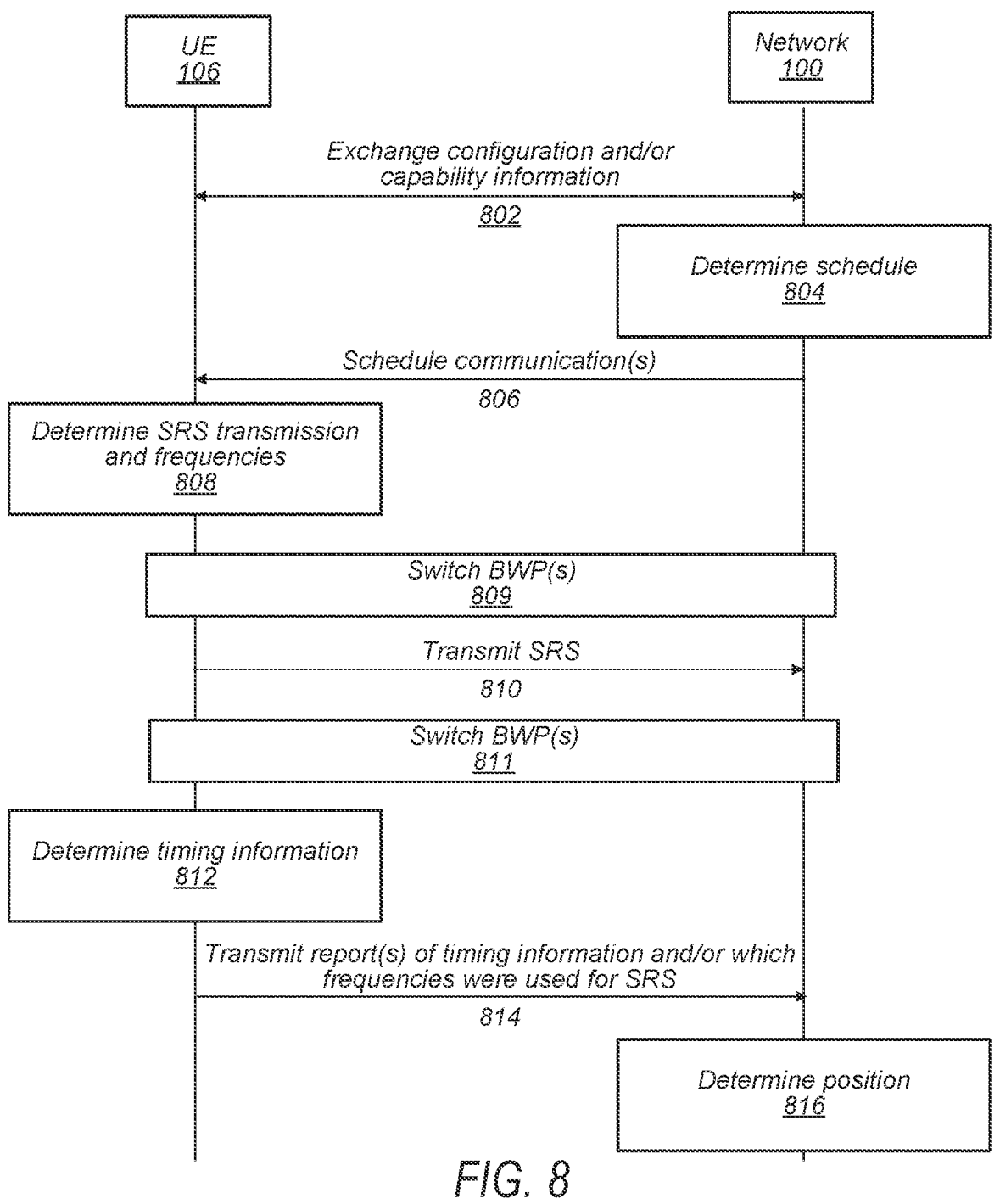
FIG. 8 illustrates a flow diagram of an example of a method for location estimation using bandwidth aggregation, according to some embodiments.

For example, FIG. 8 illustrates relevant techniques. In some embodiments, for a SRS (e.g., configured by SRS-PosResource-r16), the UE may only be expected to transmit SRS within the active UL bandwidth part (BWP) of the UE. However, according to techniques of FIG. 8, this may be modified to occur on multiple CCs and ensure SRS aggregation. For example, BWP switching for positioning SRS BW aggregation may be used. Similarly, techniques of FIG.

8 may be applicable to positioning SRS transmission with contiguous or non-contiguous carriers, e.g. intra or inter-band. Further, techniques of FIG. 8 address prioritization of different types of transmission (e.g., positioning SRS vs PUSCH, etc.). This may be achieved via joint and/or independent positioning SRS transmission and reference signal transmission. Further techniques of FIG. 8 address transmission error (TE) measurements, TE groups (TEGs), and cross carrier scheduling in relation to positioning SRS bandwidth aggregation.

FIG. 8 illustrates a flow diagram of an example method of location estimation incorporating bandwidth aggregation of positioning sounding reference signals (SRS), according to some embodiments. The method shown may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

A UE, such as UE 106 and/or UE 107, may exchange with a network 100 (e.g., one or more entity of the network e.g., a base station, such as base station 102, an LMF, such as LMF 609, etc.) configuration information and/or capability information (802), according to some embodiments. The configuration information and/or capability information may be exchanged via RRC and/or MAC signaling or control elements, among various possibilities.

As one possibility for capability information, the UE may indicate its BWP switching time. In other words, the UE may provide configuration information including the amount of time it requires to change from one UL BWP to another.

In some embodiments, each CC may have its own BWP (e.g., a first CC may have a first active BWP while a second CC may (at the same time) have a second active BWP, etc.). Thus, the switching time may incorporate that the switch has to occur in each CC independently. In other words, the BWP switching time may allow for the UE to switch the BWPs of any number of CCs.

As another possibility for capability information, the UE may indicate information about its support for UL TEGs (e.g., UE-TxTEGs for UL TDOA). In other words, the UE may provide configuration information describing the number of TEGs it supports. The UE may provide different numbers for bandwidth aggregation and non-aggregation, or may provide a single number. This may be a modification or addition to capability 27-1-2 or may be defined separately. For example, given that such capability may be defined per band and SRS aggregation may be per band too, no new capability may be defined. Thus, the maximum number of TxTEG for SRS CC (e.g., resource) for positioning, which is supported and reported by UE for UL TDOA, may be the same for SRS aggregation and single SRS transmission. Alternatively, a new capability may be defined for number of TxTEGs when UE applies SRS aggregation.

The network may transmit configuration information to the UE describing one or more configuration for transmission of UL RS (e.g., positioning SRS). The configuration(s) may include periodic, semi-persistent, and/or aperiodic transmission. Periodic and semi-persistent configurations may include timing information (e.g., time or a first transmission, period, number of transmissions, etc.). Aperiodic configurations may include triggering conditions (e.g., based on triggering signals transmitted by the network and/or other conditions observable by the UE). The configuration(s) may specify the frequencies (e.g., component carriers (CCs)) on which the UE should transmit the UL RS. It will be appreciated that any number of configurations may be indicated and that these may use the same and/or different CCs. For example, the network may transmit configuration information describing multiple aperiodic configurations, e.g., with the same or different triggering conditions and/or the same or different sets of CCs.

In some embodiments, configuration information for an aperiodic configuration for transmission of UL RS (e.g., positioning SRS) may specify the trigger(s) and related information. For example, the configuration may be triggered by DL control information (DCI). The triggering DCI may operate on a same carrier basis (e.g., a triggering DCI on a first CC or set of CCs may trigger UL RS on that (set of) CC(s)) and/or a cross carrier basis (e.g., a triggering DCI on a first CC or set of CCs may trigger UL RS on additional and/or different CC(s)). For example, a triggering DCI on a primary CC may trigger positioning SRS on all CCs. As another example, a triggering DCI on any CC may trigger positioning SRS on all CCs. As another example, the CCs may be triggered independently. For example, a triggering DCI on one or more CC may schedule triggering of positioning SRS on each of the CCs that the DCI is on. UL RS on the triggered CCs may be transmitted independently with same starting position (e.g., to be transmitted at approximately the same time, e.g., same symbol).

In some embodiments, the UE may transmit capability information describing its capability for handling the different types of triggering discussed in the previous paragraph. The network may consider this capability information and configure aperiodic UL RS consistent with the UE's reported capabilities. For example, a UE may not support cross carrier scheduling or may support cross carrier scheduling only from the primary CC. If a UE does not support cross carrier scheduling, then independent triggering of CCs may be needed to trigger multiple CCs (e.g., or multiple non-primary CCs) concurrently.

In some embodiments, one or more configuration for transmission of UL RS (e.g., positioning SRS) may include linkage of CCs. For example, the configuration information may link the CCs (e.g., using RRC configuration) The linkage may indicate that if any of them is triggered for transmission of UL-RS, it automatically triggers all of the linked CCs for the UL RS. Such a linkage may be at a CC, ResourceSetGroup, ResourceSet and/or Resource level. It will be appreciated that CCs or resources may be linked differently for different configurations, e.g., one CC may be linked to a first group for a first configuration and to a second group for a second configuration. Thus, the linkage(s) may be configuration specific.

In some embodiments, one or more configuration for transmission of UL RS (e.g., positioning SRS) may include configuration for reporting timing information about the transmission(s). For example, the UE may be configured to group the CCs on which the RS is transmitted into one or more TEGs, report the TEGs, and/or report TE information for the TEG(s). In determining such configuration information, the network may consider the UE's report of capability information (e.g., may configure TEGs less than or equal to the UE's maximum). The UE may be configured (e.g., via a high layer parameter such as nr-UE-RxTxTEG-Request or ue-TxTEG-RequestUL-TDOAConfig) to report association information of the already transmitted SRS resource(s). The SRS resource(s) may be configured by the higher layer parameter SRS-PosResource with UE Tx TEG(s) via higher layer parameter nr-SRS-TxTEG-Set or ue-TxTEGAssociationList. The association between resources/CCs and TEGs may be one TEG-to-many resources or each CC-to-one TEG. Thus, a single TxTEG-ID may be associated with all aggregated positioning SRS transmissions. Alternatively, the UE may be configured to report and associate different (or same) IDs to each of aggregated SRS transmissions on various CCs.

The network may transmit configuration information to the UE configuring any periodic or semi-persistent transmission of UL RS (e.g., positioning SRS) via RRC and/or MAC signaling. The configuration information may indicate that the UE should begin transmitting (according to the timing parameters) upon receipt of the configuration information or at an indicated start time.

The network may transmit configuration information to the UE configuring one or more BWPs. The configuration information may specify when/how/if the UE and/or network may switch between BWPs in association with UL RS. For example, as one possibility, a BWP may be configured to include all CCs associated with a particular configuration for transmission of UL RS. Alternatively, each CC may have an independent BWP, and thus a configuration for transmission of UL RS may be associated with a set of BWPs. The configuration information may specify that the UE may (e.g., autonomously) activated such a BWP or set of BWPs at any time that the UL RS are to be transmitted according to the particular configuration for transmission of UL RS.

The configuration information and/or capability information may be exchanged, described, and/or configured in relation to a wireless standard, such as NR, among various possibilities. For example, the specification of such a standard may include support for transmission of UL RS in various ways. The specification may include support for joint transmission of contiguous positioning SRS for BW aggregation only. The specification may include support for joint transmission of non-contiguous positioning SRS for BW aggregation only. The specification may include support for independent processing (e.g., on the network/receiver side) of contiguous/non-contiguous positioning SRS for BW aggregation only. In this case, the specification may provide for dynamic signaling from the UE to network to indicate which of the positioning SRS is transmitted, e.g., on which frequencies/CCs the UL RS is transmitted. Such signaling may be (a) per CC signaling (b) single CC signaling with cross-CC indication. Moreover, the specification may include support for not transmitting non-contiguous SRS (e.g., if any of the configured positioning SRS is not transmitted due to higher priority signaling, then any positioning SRS that results in a non-contiguous overall transmission is not transmitted).

In some embodiments, one or more BS may provide the UE's capability information to the LMF. The LMF may determine the configuration(s) for transmission of RS (e.g., positioning SRS) by the UE for location estimation. The LMF may provide the configuration(s) to one or more BS for transmission to the UE.

The network 100 may determine a schedule for communication with the UE 106/107 (804), according to some embodiments. The schedule may include periodic, semi-persistent, and/or aperiodic transmission of positioning SRS by the UE for location estimation. The scheduled positioning SRS may be for transmission with bandwidth aggregation. The schedule may include additional UL and/or DL communications.

To determine the schedule, the network may consider the capability information and configuration information exchanged (e.g., during 802). For example, the network may account for the BWP switching time needed by the UE when triggering an aperiodic SRS and/or in relation to a periodic or semi-persistent SRS transmission. For example, the network may determine the schedule so that the UE has time to switch from a first BWP or set of BWPs used for one UL transmission to a second BWP or set of BWPs for a second transmission, e.g., which may include UL RS transmissions aggregated over bandwidth for position estimation.

In some embodiments, the UE may not expect to be scheduled with a PUSCH when aggregated positioning SRS bandwidth is used. The network may schedule aggregated BW positioning SRS at different times than PUSCH. In some embodiments, the network may avoid scheduling any other transmission at a time aggregated BW positioning SRS is scheduled.

In some embodiments, a UE may be scheduled with a PUSCH or other transmission at the same time as aggregated BW positioning SRS. In this case, the network (e.g. LMF) may determine to transmit assistance information to the UE relating to handling the coincidence of the aggregated SRS and the other transmission(s). The assistance signaling may indicate whether the aggregated SRS is to be prioritized over the other transmissions or vice versa. For example, the assistance information may include any or all of: relative priority of different channels, an indication of if/whether the LMF can handle disjoint transmissions, and/or an indication override other information (e.g., according to an established configuration) to indicate that the UE should transmit on one or more specific CC (and/or may omit one or more CC), among various possibilities.

The assistance signaling may be transmitted via higher layer signaling (e.g., RRC, MAC, etc.) at any time (e.g., as configuration information in 802 and/or as scheduling information in 808).

The network 100 may transmit one or more messages to the UE indicating some or all of the schedule for communication (806), according to some embodiments. The UE may receive the message(s) and determine the schedule.

As one possibility, the network may use one or more DCI message(s) to indicate the scheduled transmission(s). For example, a DCI may indicate one or more PUSCH and/or UL RS transmission(s), which may be aggregated over bandwidth for position estimation. Thus, the network may send a DCI to trigger positioning SRS on one or more carriers.

A triggering DCI may be used to trigger UL RS on specific carriers in various ways. As one possibility, as discussed above with respect to 802, a triggering DCI may (e.g., implicitly) trigger the UL-RS on all CCs associated with the relevant aperiodic UL RS configuration or a linked group of CCs, according to some embodiments. Similarly, a triggering DCI on a primary CC of a linked set of CCs (e.g., a group of CCs that are linked as discussed above with respect to 802) may trigger positioning SRS on all CCs of the linked set. As another example, a triggering DCI on any CC of a linked set of CCs may trigger positioning SRS on all CCs of the linked set.

A triggering DCI may (e.g., explicitly) indicate particular CCs or sets of CCs (e.g., groups of CCs that are linked as discussed above with respect to 802) for transmission of the UL RS. For example, the triggering DCI may include a carrier indicator to indicate the CC(s) or set(s) that the positioning SRS are to be transmitted on. Such a triggering DCI may indicate all carriers with single bits. For example, a triggering DCI may include a bitmap to indicate the specific CC(s) and/or set(s). Alternatively, a triggering DCI may include a list of the specific CC(s) and/or set(s), e.g., identified by frequency or other identifier.

As one possibility, using 3 bits: bit 1 may correspond to carrier 1, bit 2 to carrier 2, and bit 3 to carrier 3.

As another possibility, using 3 bits: 000 may correspond to carrier 1, 001 to carrier 2, 010 to carrier 3, 011 to carriers 1 and 2, 100 to carriers 1 and 3, etc.

A triggering DCI may be of any of various existing formats or of a new format created for use with UL RS for positioning using bandwidth aggregation. For example, a triggering DCI may repurpose a scheduling resource indication (SRI) (e.g., DCI formats 0_1, 0_2) or a SRS request (e.g., DCI formats 1_1, 1_2). A single value in such formats may be used to indicate a CC or a linked group of CCs. Alternatively, a bitmap may indicate the group(s) or CC(s).

Further, other transmissions (e.g., PUSCH, PUCCH, other UL RS, etc.) may be scheduled. The network may transmit DCI, MAC, or RRC messages to indicate such scheduled transmission to the UE. For example, the network may transmit a DCI scheduling a PUSCH transmission, etc. Persistent and/or semi-persistent scheduling may be used as desired.

The UE may determine whether to transmit RS (e.g., positioning SRS) to the network at a first time and, if it determines to transmit the RS, may select transmission frequencies for sending the RS to the network (808), according to some embodiments.

In some embodiments, the UE may determine to transmit RS according to an aperiodic configuration based on a trigger. The trigger may include a DCI message and/or other conditions. One example of another condition that may be a trigger is reception of DL RS (e.g., PRS) for timing measurements.

In some embodiments, in order to determine whether to transmit RS, the UE may consider prioritization of the RS relative to any other transmission(s) (e.g., PUSCH, etc.). Further, the UE may consider the relationship (e.g., overlap, continuity, etc.) between the frequencies for the other transmission(s). For example, the UE may be scheduled with a PUSCH at the same time as aggregated positioning SRS. The positioning SRS may be jointly or independently transmitted. In joint transmission, positioning SRS may be transmitted on either all configured CCs or none (e.g., the transmission of positioning SRS may be dropped on all CCs). In independent transmission the UE may select to transmit positioning SRS on some CCs but not others.

As one possibility for joint transmission of positioning SRS (e.g., according to configuration information and/or assistance signaling), the UE may prioritize the SRS. In other words, if multi-carrier positioning SRS is scheduled, then multi-carrier positioning SRS may be transmitted on all CCs (e.g., associated with the relevant configuration for positioning SRS) and other transmissions may be dropped at that time. Alternatively for joint transmission (e.g., according to configuration information and/or assistance signaling), the UE may prioritize the PUSCH. In other words, if multi-carrier positioning SRS is scheduled, then multi-carrier positioning SRS may not be transmitted (e.g., may be dropped) and the PUSCH may be transmitted at that time. In some embodiments, if any of the configured positioning SRS is not transmitted due to a higher priority signal, then all positioning SRS may not be transmitted at that time.

As a further possibility for joint transmission (e.g., according to configuration information and/or assistance signaling), the UE may determine whether to transmit positioning SRS based on the active UL BWP(s), according to some embodiments. The UE may determine if an active UL BWP at the time of the scheduled positioning SRS transmission comprises all CCs configured for the positioning SRS transmission. Then, in response to a determination that the active UL BWP comprises all the CCs, the UE may determine that the first time is a valid time to transmit the positioning SRS, and thus may determine to transmit on all CCs configured for the positioning SRS transmission. Alternatively, in response to a determination that the active UL BWP does not comprise all the CCs, the UE may determine that the first time is not a valid time to transmit the positioning SRS, and thus may determine not to perform the positioning SRS transmission.

As a one possibility for independent transmission (e.g., according to configuration information and/or assistance signaling), the UE may prioritize the PUSCH or other transmission and drop the positioning SRS only on some carriers. Thus, the UE may determine whether to send positioning SRS on any CCs not used for the PUSCH based on whether a CC is contiguous with other transmissions. For example, the UE may determine to transmit the positioning SRS on any CCs that result in a contiguous frequency range with the other transmission(s). If any configured CC(s) for positioning SRS are not transmitted due to higher priority signaling, then any CC(s) for positioning SRS that result(s) in a non-contiguous overall transmission may not be transmitted. For example, CCs which are adjacent to an active BWP may be selected, while those that are neither inside nor adjacent may not be. Rules for such determination may be included in configuration information and/or assistance signaling. Alternatively for independent transmission, if any of the configured CCs for the positioning SRS are not transmitted due to a higher priority signal (e.g. PUSCH), then only those CCs used for the higher priority signal may not be used for positioning SRS. Thus, the UE may transmit positioning SRS on all other CCs configured for the positioning SRS configuration. Such a scheme may include dynamic signaling to indicate which of the positioning SRS is or is not transmitted. Such signaling may be sent by the network to the UE (e.g., in scheduling information in 806) or by the UE to the network. Such signaling may be (a) per CC signaling or (b) single CC signaling with cross-CC indication.

As a further possibility for independent transmission (e.g., according to configuration information and/or assistance signaling), the UE may select CCs based on the active UL BWP(s), according to some embodiments. For example, the UE may transmit on CCs where the BWP is active only. The UE may transmit the portion of the positioning SRS that overlaps the active BWP at the scheduled time. The UE may transmit with best effort. The UE may limit transmission on additional CCs (e.g., outside of the active BWP(s)) if the aggregated signal is not contiguous.

Thus, if the UE determines to transmit positioning SRS, it may further determine a particular set of CCs on which to transmit the positioning SRS. The set of CCs selected may be all of the CCs configured for the positioning SRS transmission, or may be a subset thereof selected based on contiguous frequency range(s), active BWP(s), among various possibilities.

In some embodiments, the network may use the same information and techniques as the UE (e.g., described above) to determine frequencies (if any) for receiving the RS (e.g., positioning SRS) from the UE.

The UE 106/107 and/or network 100 may change the active UL BWP (809), according to some embodiments.

In some embodiments, the UE and/or network may change the active UL BWP(s) in response to the scheduled RS (e.g., positioning SRS) transmission without an explicit indication to change BWP(s). In other words, the UE may be configured (e.g., based on the configuration information in 802) to autonomously switch BWPs before and/or after the positioning SRS transmission, e.g., treating the scheduled positioning SRS transmission as an implicit indication to switch to a BWP or set of BWPs that includes all of the CCs on which the UE has selected to transmit the positioning SRS.

In some embodiments, the network may transmit explicit signaling for the UE to switch BWP(s).

In some embodiments, no BWP switch may be performed (e.g., the UE may select to transmit positioning SRS only on CCs of the active UL BWP(s)).

The UE may transmit the RS (e.g., positioning SRS) to the network on the selected transmission frequencies (810), according to some embodiments. The network may receive the RS and perform measurements associated with the reception (e.g., determining time of arrival, angle of arrival, differences in timing between the RS at different frequencies, etc.). The network may record the measurements for estimating the position and/or motion of the UE.

It will be appreciated that UL RS on the triggered CCs may be transmitted independently with same starting position (e.g., may be transmitted at approximately the same time).

The UE 106/107 and/or network 100 may change the active UL BWP(s) (811), according to some embodiments. For example, the UE and/or network may change the active UL BWP(s) in response to the completing the scheduled RS (e.g., positioning SRS) transmission. The UE and/or network may change the active UL BWP(s) back to the BWP(s) that were active prior to 809 or to a different BWP(s) according to configuration or scheduling information. As noted with respect to 809, this change may be based on explicit signaling or an implicit determination. Similarly, this change may be omitted.

The UE may determine timing information about the RS (e.g., positioning SRS) (812), according to some embodiments. For example, the UE may determine the time that positioning SRS was transmitted on one or more CCs, differences between transmission times for different CCs, differences between actual transmission times and scheduled times, differences between actual transmission times and actual reception times of received downlink RS (e.g., an Rx-Tx time difference measurement based on received positioning RS (PRS), etc.), and/or similar information. The information may be recorded for individual CCs and/or groups of CCs (e.g., based of TEGs).

The UE may report the timing information to the network (814), according to some embodiments. The information may be reported in one or more reports. The information may be summarized by TEG, according to some embodiments.

In some embodiments, if the UE reports information for one or more UE Tx TEG ID with a UE Rx-Tx time difference measurement (e.g., as defined in clause 5.1.6.5 of TS 38.214), then the UE may report the association information of the already transmitted SRS resources with TEG (s). For example, the UE may report the association of configured CCs (e.g., configured by a higher layer parameter such as SRS-PosResource, SRS-PosResourceSet, SRS-Pos-ResrouceSetGroup) with the UE Tx TEG ID(s).

The network 100 may estimate a location and/or motion of the UE 106/107 (816), according to some embodiments. For example, the network may consider information such as: the network's measurement(s) of the UL RS from the UE (e.g., in 810), the UE's report(s) of timing information (e.g., in 814), time(s) at which DL RS (e.g., PRS were transmitted to the UE for which the timing information reported by the UE may include reception time(s) or related/derived measurement(s)), and/or other information. The network may use calculations such as uplink time difference of arrival (TDOA), UE/network Rx-Tx time difference, relative time of arrival (RTOA), reference signal time difference (RSTD), angle of arrival, etc. to estimate the UE's position and/or motion.

In some embodiments, the network may employ bandwidth aggregation in performing the measurements and related calculations. For example, the network may aggregate arrival times of positioning SRS received at different frequencies (e.g., multiple CCs). The use of multiple CCs may improve the accuracy of the time estimated for reception of the positioning SRS (and hence the distance to the UE). For example, the network may determine respective arrival times of the positioning SRS on respective CCs. The network may perform bandwidth aggregation (e.g., via averaging, determining a minimum, maximum, mode, and/or other statistics) to estimate a distance to the UE (and thus a position for the UE) based on the respective arrival times.

Positioning may become more accurate with larger bandwidth. To utilize bandwidth aggregation, the receiver/network may stitch together the different bandwidths and derive the positioning measurement from the larger bandwidth so as to get a more accurate measure. This may then be used to estimate the UE position.

As one possibility, a base station 102 may perform measurements, and send the measurements and related data to an LMF. The LMF may perform calculations and determine the position and/or motion estimate.

Additional Information and Examples

It will be appreciated that a CC or component carrier may be the entire carrier, according to some embodiments. Thus, a resource may be configured within a CC.

Various embodiments of FIG. 8 may be discussed with respect to CCs. It will be appreciated that such embodiments may also be performed using resources. For example, positioning SRS configurations may specify transmission of SRS on any number of resources (e.g., which may be found in any number of CCs and may or may not make up the entire bandwidth of such CC(s)). Resources may be linked in groups or sets as discussed above regarding CCs. Similarly, in 808, frequencies may be determined at a resource level, in 810 SRS may be transmitted on the corresponding resources, and in 812 and 814, timing information may be determined and reported on a resource-specific basis. Similarly, in 816, the network may use such resource-level information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In one set of embodiments, a method, may comprise: receiving, from a cellular network, configuration information for position estimation where bandwidth aggregation is used, the position estimation comprising transmission of positioning sounding reference signals (SRS) on a plurality of component carriers (CCs); receiving, from the cellular network, signaling scheduling one or more uplink transmission; determining, based on the signaling and the configuration information, to transmit positioning SRS on at least some selected CCs of the plurality of CCs at a first time; and transmitting, to the cellular network, the positioning SRS on the selected CCs at the first time.

In some embodiments, the method may further comprise: determining, based on the signaling and the configuration information, to switch from a first BWP to a second BWP in preparation for transmission of the positioning SRS on the selected CCs at the first time, wherein: the first BWP does not include at least one CC of the selected CCs; and the second BWP includes all CCs of the selected CCs.

In some embodiments, each CC has its own BWP.

In some embodiments, determining to transmit the positioning SRS on the selected CCs at the first time comprises: selecting the selected CCs based on the selected CCs being within an active uplink (UL) bandwidth part (BWP), wherein at least a first CC of the plurality of CCs is not selected based on not being within the active UL BWP.

In some embodiments, at least a second CC of the plurality of CCs is selected based on being contiguous with the active UL BWP but not within the active UL BWP.

In some embodiments, the selected CCs are contiguous in frequency.

In some embodiments, the selected CCs are non-contiguous in frequency.

In some embodiments, the one or more uplink transmission comprises a non-SRS uplink transmission at the first time, wherein determining to transmit the positioning SRS on the selected CCs at the first time comprises: selecting the selected CCs based on the selected CCs being contiguous with frequency resources of the non-SRS uplink transmission at the first time, wherein at least a first CC of the plurality of CCs is not selected based on not being contiguous with frequency resources of the non-SRS uplink transmission at the first time.

In some embodiments, the method may further comprise: determining that the non-SRS uplink transmission is higher priority than transmitting the positioning SRS; and wherein at least a second CC of the plurality of CCs is not selected based on colliding with frequency resources of the non-SRS uplink transmission at the first time.

In some embodiments, the one or more uplink transmission comprises a non-SRS uplink transmission at the first time, wherein the method further comprises determining not to transmit the non-SRS uplink transmission at the first time.

In some embodiments, the one or more uplink transmission comprises a non-SRS uplink transmission at a second time, wherein the method further comprises: determining that SRS is scheduled at the second time and SRS on a first CC of the plurality of CCs collides with the non-SRS uplink transmission; and determining not to transmit the positioning SRS on any of the plurality of CCs at the second time.

In some embodiments, the one or more uplink transmission comprises a non-SRS uplink transmission at the first time, wherein determining to transmit the positioning SRS on the selected CCs at the first time comprises: selecting the selected CCs based on the selected CCs being distinct from one or more CCs scheduled for the non-SRS uplink transmission at the first time, wherein at least a first CC of the plurality of CCs is not selected based on being scheduled for the non-SRS uplink transmission at the first time.

In some embodiments, any CC that would result in a non-contiguous overall transmission at the first time is not selected.

In some embodiments, the method may further comprise: transmitting, to the cellular network, an indication of a maximum supported number of transmission timing error groups (TxTEGs) for uplink time difference of arrival (TDOA) for transmitting SRS on multiple CCs at a time.

In some embodiments, a single transmission timing error group (TxTEG) identifier is associated with the selected CCs.

In some embodiments, respective transmission timing error group (TxTEG) identifiers are associated with respective subsets of the selected CCs.

In some embodiments, the method may further comprise: transmitting, to the cellular network, an indication of the respective TxTEG identifiers associated with the respective subsets of the selected CCs.

In some embodiments, the method may further comprise: transmitting, to the cellular network, a report of one or more time difference measurement, wherein transmitting the indication of the respective TxTEG identifiers associated with the respective subsets of the selected CCs is in response to transmitting the report.

In some embodiments, the signaling comprises a downlink control information (DCI) message, wherein the determination to transmit the positioning SRS on the selected CCs at the first time is in response to the DCI message being on a primary CC.

In some embodiments, the signaling comprises a downlink control information (DCI) message, wherein the determination to transmit the positioning SRS on the selected CCs at the first time is in response to the DCI message regardless of whether the DCI message is on a primary CC.

In some embodiments, the signaling comprises a downlink control information (DCI) message, wherein the determination to transmit the positioning SRS on the selected CCs at the first time is in response to the DCI message being on the selected CCs.

In some embodiments, the configuration information comprises an indication grouping the selected CCs.

In some embodiments, the configuration information comprises an indication of a plurality of groupings of CCs of the plurality of CCs.

In some embodiments, the signaling comprises a downlink control information (DCI) message comprising an indication of a first grouping of the plurality of groupings, wherein the determination to transmit the positioning SRS on the selected CCs at the first time is responsive to the DCI message indicating the first grouping.

In some embodiments, the DCI is formatted according to one of formats 0_1, 0_2, 1_1, or 1_2.

In some embodiments, the DCI is formatted according to a new format.

In some embodiments, the signaling comprises a downlink control information (DCI) message comprising a bitmap indicating respective CCs of the plurality of CCs, wherein the determination to transmit the positioning SRS on the selected CCs at the first time is in response to the bitmap.

In some embodiments, the bitmap indicates one or more groups of CCs.

In some embodiments, determining to transmit the positioning SRS on the selected CCs at the first time comprises: determining that an active uplink (UL) bandwidth part (BWP) at the first time comprises all CCs of the plurality of CCs; and determining, in response to the determination that the active UL BWP at the first time comprises all CCs of the plurality of CCs, that the first time is a valid time to transmit the positioning SRS, wherein determining to transmit the positioning SRS on the selected CCs at the first time is in response to determining that the first time is the valid time to transmit the positioning SRS.

In some embodiments, the method may further comprise: determining, based on the signaling and the configuration information, that the positioning SRS is scheduled at a second time; determining that an active UL BWP at the second time does not comprise all CCs of the plurality of CCs; and determining, in response to determining that the active UL BWP at the second time does not comprise all CCs of the plurality of CCs, not to transmit positioning SRS at the second time.

In some embodiments, the signaling comprises a downlink control information (DCI) message, the DCI message comprising a list of CCs or groups of CCs, wherein the determination to transmit the positioning SRS on the selected CCs at the first time is in response to the list.

In some embodiments, the method may further comprise receiving assistance information, wherein determining to transmit the positioning SRS on the selected CCs at the first time is further based on the assistance information.

In some embodiments, the method may further comprise: transmitting, to the cellular network, an indication of a bandwidth part (BWP) switching time; and switching, from a first active uplink (UL) BWP to a second active UL BWP prior to the first time by at least the BWP switching time.

In some embodiments, the BWP switching time allows for the UE to switch the BWPs of any number of CCs.

In some embodiments, each CC has its own BWP.

In some embodiments, the method may further comprise: determining, based on the signaling and the configuration information, to switch from a first BWP to a plurality of BWPs in preparation for transmission of the positioning SRS on the selected CCs at the first time, wherein: the first BWP does not include at least one CC of the selected CCs; and the plurality of BWPs includes all CCs of the selected CCs.

In some embodiments, each CC has its own BWP.

In one set of embodiments, a method, may be comprising: transmitting, to a user equipment (UE), configuration information for position estimation where bandwidth aggregation is used, the position estimation comprising reception of positioning sounding reference signals (SRS) on a plurality of component carriers (CCs); transmitting, to the UE, signaling scheduling one or more uplink transmission; and receiving, from the UE, the positioning SRS on the selected CCs at a first time, consistent with the signaling and the configuration information.

In some embodiments, the method may further comprise: determining respective arrival times of the positioning SRS on respective CCs of the selected CCs; and performing bandwidth aggregation to estimate a position for the UE based on the respective arrival times.

In some embodiments, the method may further comprise: transmitting, to the cellular network, an indication of a bandwidth part (BWP) switching time; and determining a schedule for the UE based at least in part on the BWP switching time wherein the schedule allows the UE at least the BWP switching time to switch from a first active uplink (UL) BWP to a second active UL BWP prior to the first time.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
receiving, from a cellular network, configuration information for position estimation where bandwidth aggregation is used, the position estimation comprising transmission of positioning sounding reference signals (SRS) on a plurality of component carriers (CCs);
receiving, from the cellular network, signaling scheduling one or more uplink transmission;
determining, based on the signaling and the configuration information, to transmit positioning SRS on at least some CCs of the plurality of CCs at a first time;
determining, based on the signaling and the configuration information, to switch from a first bandwidth part (BWP) to a second BWP in preparation for transmission of the positioning SRS on the at least some CCs at the first time, wherein:
    the first BWP does not include at least one CC of the at least some CCs; and
    the second BWP includes all CCs of the at least some CCs; and
transmitting, to the cellular network, the positioning SRS on the at least some CCs at the first time.

2. The method of claim 1, wherein each CC has its own BWP.

3. The method of claim 1, wherein the first time is based on a switching time.

4. The method of claim 3, further comprising: transmitting, to the cellular network, capability information comprising an indication of the switching time.

5. The method of claim 3, wherein the switching time is a bandwidth part (BWP) switching time.

6. The method of claim 5, wherein the BWP switching time is BWP specific.

7. The method of claim 5, wherein the BWP switching time incorporates that a BWP switch occurs in different CCs independently.

8. The method of claim 1, wherein the configuration information comprises an indication grouping the at least some CCs.

9. The method of claim 1, wherein the configuration information comprises an indication of a plurality of groupings of CCs of the plurality of CCs.

10. The method of claim 9, wherein the signaling comprises a downlink control information (DCI) message comprising an indication of a first grouping of the plurality of groupings, wherein the determination to transmit the positioning SRS on the at least some CCs at the first time is responsive to the DCI message indicating the first grouping.

11. The method of claim 10, wherein the DCI is formatted according to one of formats 0_1, 0_2, 1_1, or 1_2.

12. The method of claim 10, wherein the DCI is formatted according to a format in which a single value or a bitmap is used to indicate a CC or a linked group of CCs.

13. The method of claim 1, wherein the signaling comprises a downlink control information (DCI) message comprising a bitmap indicating respective CCs of the plurality of CCs, wherein the determination to transmit the positioning SRS on the at least some CCs at the first time is in response to the bitmap.

14. The method of claim 13, wherein the bitmap indicates one or more groups of CCs.

15. A method, comprising:
transmitting, to a user equipment (UE), configuration information for position estimation where bandwidth aggregation is used, the position estimation comprising reception of positioning sounding reference signals (SRS) on a plurality of component carriers (CCs);
transmitting, to the UE, signaling scheduling one or more uplink transmission;
determining, based on the signaling and the configuration information, that the UE is expected to switch from a first bandwidth part (BWP) to a second BWP in preparation for transmission of the positioning SRS on the at least some CCs at the first time, wherein:
    the first BWP does not include at least one CC of the at least some CCs; and
    the second BWP includes all CCs of the at least some CCs; and
receiving, from the UE, the positioning SRS on at least some CCs of the plurality of CCs at a first time, consistent with the signaling and the configuration information.

16. The method of claim 15, wherein the first time is based on a switching time.

17. The method of claim 16, further comprising: receiving, from the UE, capability information comprising an indication of the switching time.

18. The method of claim 17, wherein the configuration information is based at least in part on the switching time.

19. An apparatus, comprising:
a processor configured to perform operations, the operations comprising:
    receiving, from a cellular network, configuration information for position estimation where bandwidth aggregation is used, the position estimation comprising transmission of positioning sounding reference signals (SRS) on a plurality of component carriers (CCs);
    receiving, from the cellular network, signaling scheduling one or more uplink transmission;

determining, based on the signaling and the configuration information, to transmit positioning SRS on at least some CCs of the plurality of CCs at a first time;

determining, based on the signaling and the configuration information, to switch from a first bandwidth part (BWP) to a second BWP in preparation for transmission of the positioning SRS on the at least some CCs at the first time, wherein:

the first BWP does not include at least one CC of the at least some CCs; and the second BWP includes all CCs of the at least some CCs; and transmitting, to the cellular network, the positioning SRS on the selected CCs at the first time.

20. The apparatus of claim 19, wherein each CC has its own BWP.

* * * * *